(12) United States Patent
Knoblauch

(10) Patent No.: US 9,855,830 B2
(45) Date of Patent: Jan. 2, 2018

(54) ELECTRIC AXLE DRIVE FOR A MOTOR VEHICLE

(71) Applicant: Dr. Ing. h.c. F. Porsche Aktiengesellschaft, Stuttgart (DE)

(72) Inventor: Daniel Knoblauch, Ludwigsburg (DE)

(73) Assignee: DR. ING. H.C.F. PORSCHE AKTIENGESELLSCHAFT, Stuttgart (DE)

( * ) Notice: Subject to any disclaimer, the term of this patent is extended or adjusted under 35 U.S.C. 154(b) by 136 days.

(21) Appl. No.: 14/942,175

(22) Filed: Nov. 16, 2015

(65) Prior Publication Data

US 2016/0146322 A1    May 26, 2016

(30) Foreign Application Priority Data

Nov. 25, 2014   (DE) .................. 10 2014 117 227

(51) Int. Cl.
*B60K 1/00* (2006.01)
*F16H 48/36* (2012.01)
*F16H 3/54* (2006.01)

(52) U.S. Cl.
CPC .......... *B60K 1/00* (2013.01); *B60K 2001/001* (2013.01); *F16H 3/54* (2013.01); *F16H 48/36* (2013.01); *F16H 2048/364* (2013.01); *F16H 2200/0034* (2013.01); *F16H 2200/2005* (2013.01); *F16H 2200/2035* (2013.01); *F16H 2200/2064* (2013.01); *F16H 2200/2079* (2013.01)

(58) Field of Classification Search
None
See application file for complete search history.

(56) References Cited

U.S. PATENT DOCUMENTS

| 8,651,991 | B1 | 2/2014 | Sten et al. |
| 9,140,335 | B2 | 9/2015 | Knoblauch |
| 9,453,564 | B1* | 9/2016 | Pritchard ............. B60K 17/346 |
| 2002/0019284 | A1* | 2/2002 | Aikawa .................... B60K 1/00 475/150 |
| 2012/0142487 | A1* | 6/2012 | Winter .................... B60K 1/00 475/332 |
| 2013/0102431 | A1 | 4/2013 | Doleschel et al. |
| 2013/0190124 | A1* | 7/2013 | Gassmann ............... B60K 1/00 475/150 |

FOREIGN PATENT DOCUMENTS

| JP | 59185449 U | 12/1984 |
| JP | 2004514104 A | 5/2004 |
| WO | 2010066532 A1 | 6/2010 |
| WO | 2011/076542 | 6/2011 |

OTHER PUBLICATIONS

Chinese Office Action dated Jul. 28, 2017.

* cited by examiner

*Primary Examiner* — Jacob S Scott
(74) *Attorney, Agent, or Firm* — Gerald E. Hespos; Michael J. Porco; Matthew T. Hespos

(57) ABSTRACT

An electric axle drive (1) for a motor vehicle has an electric machine (2) for driving at least one output shaft (15, 16) of the axle (13) of the motor vehicle and has a spur gear unit (5) with two spur gear stages (6, 7). The electric machine (2) can drive the spur gear stages (6, 7), which, in turn, can drive a planetary gear unit (14). The planetary gear unit (14) can be shifted between two gears. In the first gear, a transmission ratio is shifted in the planetary gear unit (14), and, in the second gear, the planetary gear unit (14) is shifted as a block.

17 Claims, 2 Drawing Sheets

ELECTRIC AXLE DRIVE FOR A MOTOR VEHICLE

CROSS REFERENCE TO RELATED APPLICATION

This application claims priority under 35 USC 119 to German Patent Appl. No. 10 2014 117 227.2 filed on Nov. 25, 2014, the entire disclosure of which is incorporated herein by reference.

BACKGROUND

1. Field of the Invention

The invention relates to an electric axle drive for a motor vehicle, having an electric machine for driving at least one output shaft of the axle of the motor vehicle, and having a spur gear unit.

2. Description of the Related Art

WO 2011/076542 A1 discloses an electric axle drive that has an electric machine with an output shaft that runs parallel to the axle of the motor vehicle. A gear stage applies the torque of the electric machine to a differential, arranged on the axle. The gear stage is a single-stage spur gear unit connected upstream. The electric axle further has a torque-vectoring unit that acts on a layshaft gear unit so that the torques can be distributed within the axle on a wheel-specific basis. The layshaft gear unit is composed of two power-split planetary gear units that have the same dimensions and are shifted in parallel. The wheel-specific distribution of the torques can be adjusted in an infinitely variable fashion by the torque of an electric machine of the torque-vectoring unit. A load-compensating gear stage, as an active stage in the form of a planetary gear unit, is connected downstream of the power-split planetary gear units to combine the torque flux, split by the power-splitting planetary gear units, for the output.

An object of the invention is to provide an electric axle drive for a motor vehicle that enables a vehicle to be driven purely electrically over a wide speed range, with optimum efficiency of the axle drive.

SUMMARY

The invention relates to an electric axle that has an electric machine and a spur gear unit with two spur gear stages for driving a planetary gear unit. The planetary gear unit can be shifted between two gears of the electric axle. In the first gear a transmission ratio is shifted in the planetary gear unit and in the second gear the planetary gear unit is shifted as a block.

The second gear is the primary gear, and, in the second gear, only the two spur gear stages are in the power flux and in motion. The shiftable planetary gear set rotates in the block. As a result, efficiency advantages can be obtained. The electric axle drive can be operated in two gears. Thus, it is possible to drive the vehicle purely electrically over a wide speed range.

The center axis of the planetary gear unit may be coaxial with the center axis of the at least one output shaft to achieve a structurally compact arrangement.

The electric machine drives the at least one output shaft via an intermediate shaft and the at least one output shaft drives one or more wheels of the axle. Two output shafts preferably are provided and can be driven by the electric machine. The electric machine functions to drive the wheels of the axle that are assigned to an output shaft.

An output gear wheel of the spur gear unit may be connected to a ring gear of the planetary gear unit. Planetary gears of the planetary gear unit are mounted in a planetary carrier and mesh with the ring gear and a sun gear of the planetary gear unit. The output shaft can be driven by the planetary carrier that forms the output of the planetary gear unit.

This connection of the planetary gear unit to the spur gear unit and to the at least one output shaft makes it possible to implement shifting states of the individual gears that ensure very good fail-safe behavior.

One embodiment may be configured so that, in the first gear, a brake for blocking the sun gear is closed, and a clutch for coupling the sun gear and ring gear is opened. In a second gear, a brake for blocking the sun gear is opened, and a clutch for coupling the sun gear and the ring gear is closed. This may involve a normally-open brake for the first gear and a normally-closed clutch for the second gear. This normally-closed clutch may be effective in a frictionally locking fashion.

Another embodiment may be configured so that, in a first gear, a freewheel blocks the sun gear, and a clutch for coupling the sun gear and the ring gear is opened. In the second gear, the freewheel releases the sun gear, and the clutch for coupling the sun gear and ring gear is closed. Thus, a freewheel is provided for the first gear and a normally-closed clutch that acts in a frictionally locking fashion is provided for the second gear.

The brake/clutch may be a dry brake/clutch to ensure low drag losses and a high efficiency level. Alternatively, the brake/clutch may be a wet brake/clutch to permit high performance.

The electric axle drive can be power-shifted by the clutch and brake or freewheel. The power-shiftability is provided when there is a combination of the clutch and freewheel, preferably with just one actuator. Two actuators are provided for the clutch or clutches and for the brake when there is a combination of the brake and clutch or clutches.

Recuperation is possible in both the first and in the second gears for the first embodiment that uses the brake and the clutch. Recuperation is possible for the second embodiment only in the second gear, since a freewheel is used. In the first gear, such recuperation is possible when there is a combination with an optional claw clutch.

The output of the planetary gear unit may be used to drive a planetary differential whose output is assigned two output shafts. The planetary differential may be a planetary differential with a Ravigneaux-type planetary set.

A torque-vectoring unit can be provided in the case of the electric axle drive. This torque-vectoring unit may have a further electric machine and a superimposition gear unit for generating a differential torque between the two output shafts. In addition, the torque-vectoring unit can have a transmission stage between the further electric machine and the superimposition gear unit.

The center axis of the planetary gear unit may be coaxial with the respective center axis of the planetary differential and/or of the superimposition gear unit and/or of the transmission stage and/or of the other electric machine to achieve a particularly compact configuration of the electric axle drive and a compact arrangement of electric axle with respect to the two output shafts.

The invention thus provides an electric, power-shiftable two-gear axle drive with an optional torque-vectoring unit.

Further features of the invention can be found in the appended drawing and the description of the preferred exemplary embodiments that are represented in the drawing, without being restricted thereto.

DETAILED DESCRIPTION

The electric axle drive may be used in a passenger car. Two wheels of an axle of the motor vehicle are driven by means of the electric axle drive.

Figure 1:
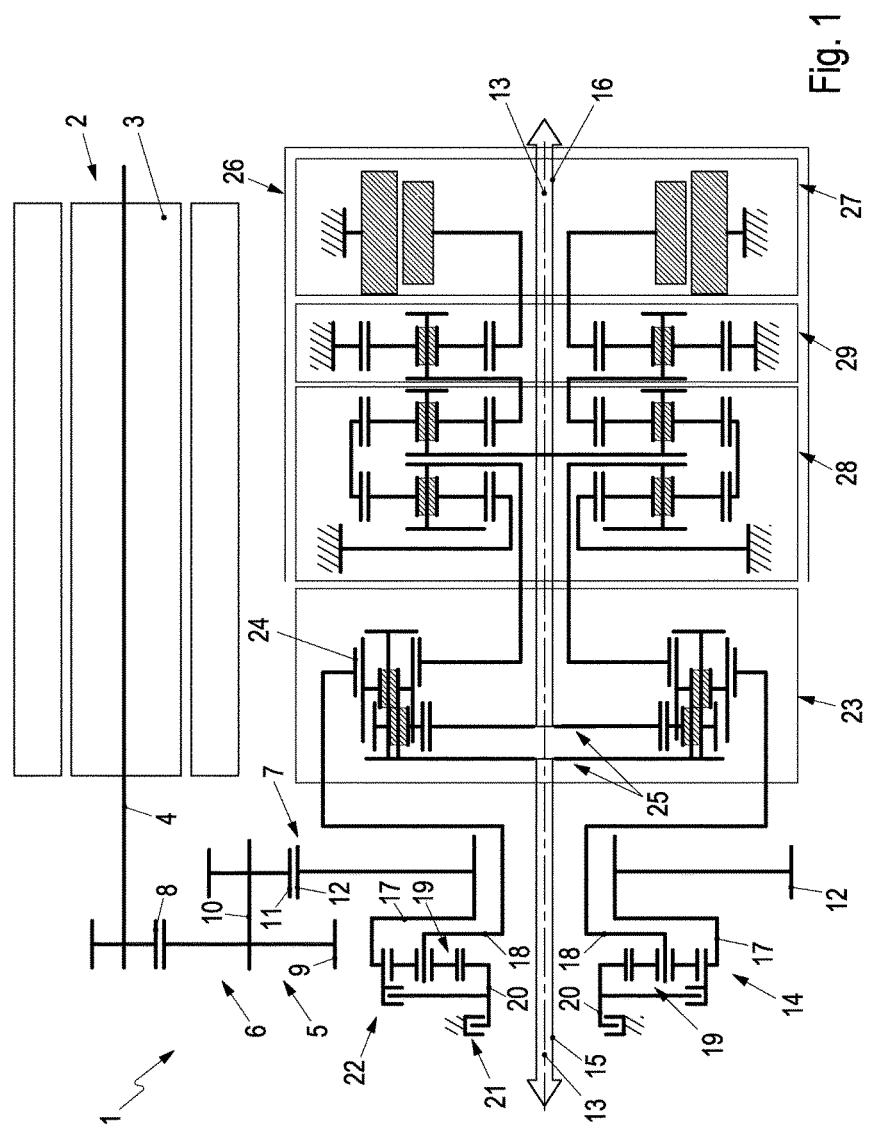
FIG. 1 is a schematic illustration of the drive components of the electric axle drive for a first exemplary embodiment.

FIG. 1 illustrates the basic design of a first embodiment an electric axle drive 1 that includes an electric machine 2 with a rotor 3 and a rotor shaft 4 connected thereto. The electric machine 2 interacts with a spur gear unit 5 that has two spur gear stages 6 and 7. The spur gear stage 6 has a small spur gear 8 connected in a rotationally fixed fashion to the rotor shaft 4 and meshes with a large spur gear 9 of the spur gear stage 6. This spur gear 9 is connected in a rotationally fixed fashion to an intermediate shaft 10 that receives a small spur gear 11 of the spur gear stage 7 in a rotationally fixed fashion. The spur gear 11 meshes with a large spur gear 12 of the spur gear stage 7. The spur gear 12 rotates during operation of the electric machine 2 about an axis 13 that constitutes a center axis of a planetary gear unit 14 that can be driven by the electric machine 2.

This axis 13 also represents the rotational axis of two output shafts 15, 16 of the electric axle drive 1 that function to drive the respective wheels of the axle of the motor vehicle. The output shafts, therefore, are output shafts of the electric axle drive or of the gear unit for driving the wheels of the passenger car in the region of the vehicle axle.

The planetary gear unit 14 has a ring gear 17, planetary gears 19 mounted in a planetary carrier 18, and a sun gear 20. The spur gear 12 of the spur gear stage 7 is connected to the ring gear 17. The planetary gears 19 mesh with the ring gear 17 and the sun gear 20. The planetary carrier 18 forms the output of the planetary gear unit 14 and drives the output shafts 15 and 16, as described in more detail below.

The electric axle drive 1 has first and second gears. In the first gear, a brake 21 for blocking the sun gear 20 is closed, and a clutch 22 for coupling the sun gear 20 and ring gear 17 is opened. The brake 21 and the clutch 22 are shifted by a common actuator (not illustrated). In the second gear, the brake 21 for blocking the sun gear 20 is opened, and the clutch 22 for coupling the sun gear 20 and ring gear 17 is closed. A good fail-safe behavior occurs in the first gear due to the normally-open brake and for the second gear due to the normally-closed clutch, preferably acting in a frictionally locking fashion. In this context, recuperation is possible in the first gear and in the second gear due to the rotationally fixed connection on the basis of the brake 21 or the clutch 22.

The sun gear 20 is fixed in the first gear so that the torque flux from the unit formed from the spur gear 12 and the ring gear 17 occurs via the planetary gears 19 into the planetary carrier 18 and from there to the output shafts 15, 16. In contrast, the second gear is used primarily, and the planetary gear unit 14 is shifted as a block in the second gear. Therefore, only the two toothed spur gear stages 6, 7, are arranged in the power flux. In the first gear, the transmission is implemented in the planetary gear unit 14 by using the brake 21 with the clutch 22 opened.

A ring gear 24 of the planetary differential 23 can be driven via the planetary carrier 18 as the output of the planetary gear unit 14. The two drive shafts 15, 16 are assigned to the output 25 of the planetary differential 23. The planetary differential 23 is embodied as a planetary differential with a Ravigneaux-type planetary set.

The electric axle drive 1 also has a torque-vectoring unit 26 with a further electric machine 27 and a superimposition gear unit 28 for generating a differential torque between the two output shafts 15, 16. The torque-vectoring unit 26 also has a transmission stage 29 between the electric machine 27 and the superimposition gear unit 28.

The axis or center axis 13 of the planetary gear unit 14 is arranged coaxially with respect to the center axis of the electric machine 27, superimposition gear unit 28 and transmission stage 29. The center axis also is denoted by the reference number 13.

Figure 2:
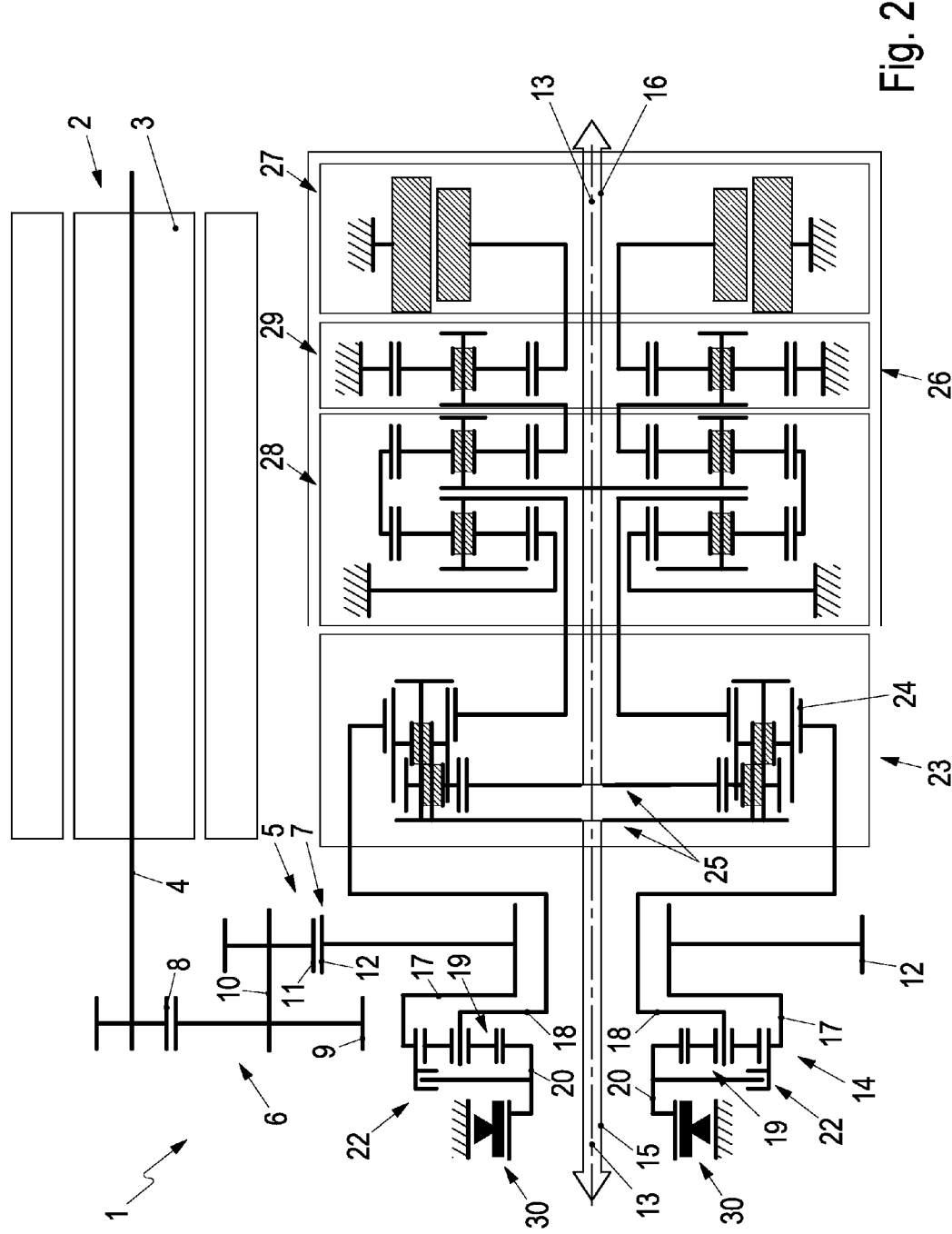
FIG. 2 is a schematic illustration of the drive components of the electric axle drive for a second exemplary embodiment.

The embodiment of FIG. 2 uses the same reference symbols as FIG. 1 for corresponding components. FIG. 2 is modified from FIG. 1 in that a freewheel 30 is provided instead of the brake 21. In the first gear, the freewheel 30 blocks the sun gear 20, and the clutch 22 for coupling the sun gear 20 and the ring gear 17 is opened. In the second gear, the freewheel 30 releases the sun gear 20, and the clutch 22 for coupling the sun gear 20 and the ring gear 17 is closed. Particularly good fail-safe behavior is obtained with this variant in the case of the freewheel for the first gear and a normally-closed clutch, preferably a frictionally locking clutch for the second gear. In this variant, recuperation is possible in the second gear. Recuperation in the first gear is possible only in combination with an optional clutch, in particular a claw clutch.

What is claimed is:

1. An electric axle drive for a motor vehicle, comprising:
an electric machine;
a spur gear unit having two spur gear stages that can be driven by the electric machine;
a planetary gear unit that can be driven by the two spur gear stages for driving at least one output shaft of an axle of the motor vehicle, the planetary gear unit being shiftable between first and second gears, wherein in the first gear a transmission ratio is shifted in the planetary gear unit and in the second gear the planetary gear unit is shifted as a block, wherein the output of the planetary gear unit drives a planetary differential whose output is assigned two output shafts, the planetary differential having a Ravigneaux-type planetary set.

2. The electric axle drive of claim 1, wherein a center axis of the planetary gear unit is coaxial with a center axis of the at least one output shaft.

3. The electric axle drive of claim 2, wherein an output gear wheel of the spur gear unit is connected to a ring gear of the planetary gear unit.

4. The electric axle drive of claim 3, wherein the planetary gear unit has a planetary carrier and planetary gears mounted in the planetary carrier, the planetary gears meshing with the ring gear and a sun gear of the planetary gear unit, the planetary carrier forming an output of the planetary gear unit and being operative to drive the at least one output shaft.

5. The electric axle drive of claim 4, wherein in the first gear a brake for blocking the sun gear is closed, and a clutch for coupling the sun gear and ring gear is opened.

6. The electric drive of claim 5, wherein in the second gear a brake for blocking the sun gear is opened, and a clutch for coupling the sun gear and the ring gear is closed.

7. The electric axle drive of claim 4, wherein in the first gear a freewheel blocks the sun gear, and a clutch for coupling the sun gear and the ring gear is opened.

8. The electric axle drive of claim 4, wherein in the second gear a freewheel releases the sun gear, and a clutch for coupling the sun gear and ring gear is closed.

9. The electric drive of claim 8, wherein the freewheel is combined with a claw clutch for recuperation.

10. The electric axle drive of claim 8, wherein shifting of the planetary gear unit is carried out by a single actuator.

11. The electric axle drive of claim 1, further comprising a torque-vectoring unit.

12. An electric axle drive for a motor vehicle, comprising:
an electric machine;
a spur gear unit having two spur gear stages that can be driven by the electric machine;
a planetary gear unit that can be driven by the two spur gear stages for driving at least one output shaft of an axle of the motor vehicle, the planetary gear unit being shiftable between first and second gears, wherein in the first gear a transmission ratio is shifted in the planetary gear unit and in the second gear the planetary gear unit is shifted as a block; and
a torque-vectoring unit, wherein the torque-vectoring unit has a further electric machine and a superimposition gear unit for generating a differential torque between two output shafts.

13. The electric axle drive of claim 12, wherein the torque-vectoring unit has a transmission stage arranged between the further electric machine and the superimposition gear unit.

14. The electric axle drive of claim 13, wherein a center axis of the planetary gear unit is coaxial with a center axis of the planetary differential.

15. The electric axle drive of claim 14, wherein the center axis of the planetary gear unit is coaxial with a center axis of the superimposition gear unit.

16. The electric axle drive of claim 15, wherein the center axis of the planetary gear unit is coaxial with a center axis of the transmission stage.

17. The electric axle drive of claim 16, wherein the center axis of the planetary gear unit is coaxial with a center axis of the further electric machine.

* * * * *